Patented Aug. 28, 1951

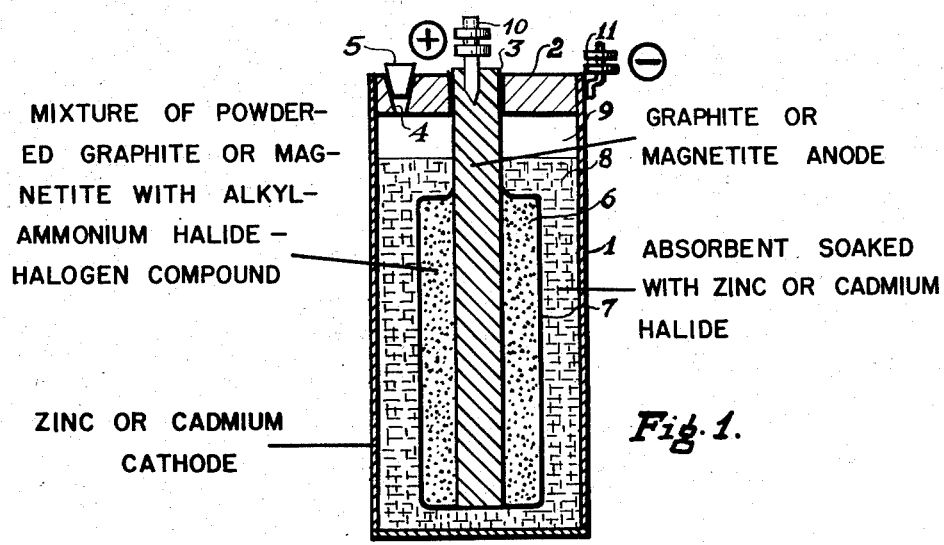
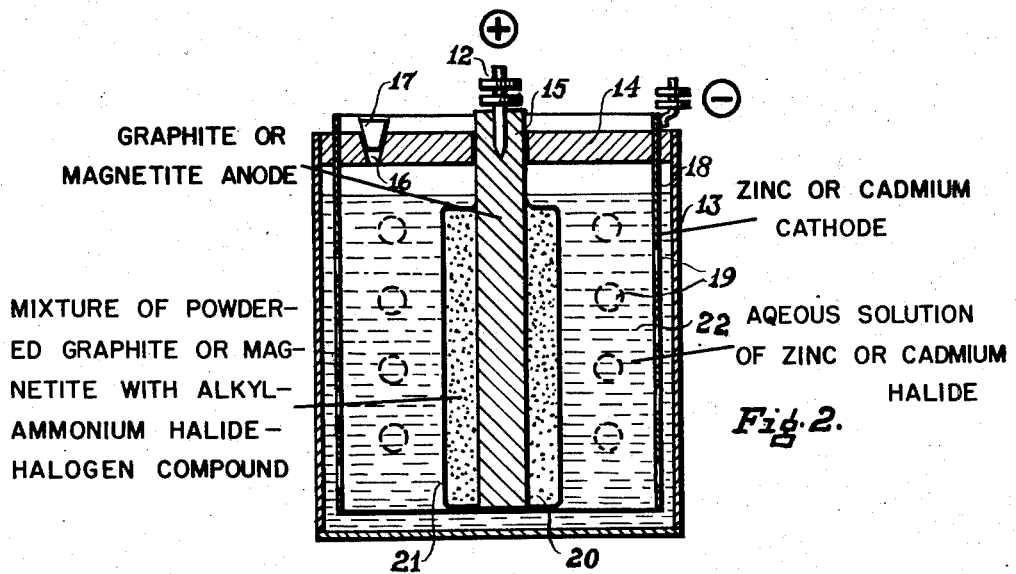

2,566,114

UNITED STATES PATENT OFFICE 2,566,114

ELECTRIC CELL

Rudolf Bloch, Jerusalem, Palestine

Application July 11, 1946, Serial No. 682,736
In Palestine August 1, 1945

12 Claims. (Cl. 136—6)

This invention aims at the improvement of the known cells, both primary and secondary, of the type in which the insoluble positive pole is initially or by re-charging associated with reactive non-ionic halogen other than fluorine which is converted into halogen ion during the discharge; the soluble negative pole is a metal standing low in the electromotive series, e. g. zinc or cadmium, and the electrolyte is as a rule an aqueous solution of a substantially neutral salt having as cation the metal serving for the negative pole, and as anion the halogen associated to the positive pole. These cells do not develop gas.

In known cells of this kind, the positive pole is surrounded by activated carbon serving for the adsorption of elementary halogen which is released therefrom as the discharge proceeds. However, the amount of halogen that can be adsorbed by the carbon is small and the adsorptive capacity drops continuously as the amount of adsorbed halogen increases. Accordingly, such cells have a small capacity and short life if used as primary cells, and a small capacity and large leakage current if used as secondary cell.

This invention aims at providing a cell similar to the type referred to that has a larger life and higher capacity than those hitherto known.

The invention consists in a primary or secondary cell having an insoluble positive pole formed by a conductor which is relatively little attacked by halogen, e. g. carbon, platinum or magnetite, a soluble negative electrode of zinc, cadmium or the like, and an aqueous salt solution as electrolyte, wherein the positive pole is surrounded initially or by charging with alkyl-ammonium halide associated with non-ionic halogen other than fluorine.

The term "alkyl-ammonium halide" as used in connection with this invention is intended to cover all those alkyl-ammonium halides which are capable of associations with elementary halogen in non-ionic bond.

Where the cell is destined to be used as a primary one only, the electrolyte may have any suitable initial composition, e. g. alkali metal halide or alkali sulfate. In the case of a secondary cell, the electrolyte will consist of or contain a halide of the metal of which the soluble pole is made. The electrolyte may advantageously also contain some silicofluoride, e. g. an alkali metal salt. The cell may be either a wet or a dry one.

Among alkyl-ammonium halides, the tetramethyl $((CH_3)_4 N Hal)$ and tetraethyl $((C_2H_5)_4 N Hal)$ compounds have proved especially suitable. For example, one molecule of tetramethyl-ammonium bromide is capable of binding up to nine atoms of bromide in non-ionic bond, and of giving all the non-ionic bromine off during the discharge of the cell.

A cell according to this invention may be made, for example, as follows:

The cell has an outer container, which may consist of any suitable material, not necessarily acid-proof, e. g. glass or cement. The positive pole is a graphite rod, and the negative pole a rod or sheet of zinc. The electrolyte is a saturated aqueous solution of the double-salt $$ZnBr_2.N(CH_3)_4Br$$ 

with an addition of potassium sulfate in the amount of 10 grs. $K_2SO_4$ for each litre of said solution. The cell is initially charged, whereby elementary bromine is formed by the decomposition of bromide and combines with the portion of tetramethyl-ammonium bromide surrounding the positive pole, and the open-circuit E. M. F. of the cell is raised to 1.8 volts. Its capacity is 1 ampère/hour for each 3 grs. of non-ionic bromine combined with the tetramethyl-ammonium bromide. Upon discharging, the non-ionic bromine is reduced to bromine ion, and an equivalent amount of zinc is dissolved from the negative pole. When the cell has been exhausted it can be re-charged, the bromine ion is oxidized to elementary bromine and re-combines with the tetramethyl-ammonium bromide, and an equivalent amount of zinc is re-deposited on the negative pole. There is virtually no development of gas when the cell is charged.

The reactions taking place on charging the cell may be expressed by the following summary equations:

$ZnBr_2.N(CH_3)_4Br \rightarrow ZnBr_2 + N(CH_3)_4Br$ 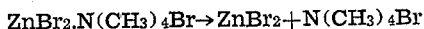
$4 ZnBr_2 \rightarrow 4 Zn + 4 Br_2$ 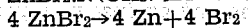
$N(CH_3)_4 + 4 Br_2 \rightarrow N(CH_3)_4Br.(4 Br_2)$ 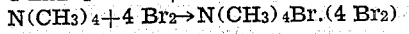

This last named compound, which contains nine atoms of bromine, has only one of them in ionic form while the remaining eight bromine atoms are in the non-ionic state and bound to the tetramethylammonium bromide in a manner not yet fully understood but at all events so that they behave like elementary bromine.

Dry cells according to this invention can be made in the usual way with the aid of an absorbent. The zinc pole may form the container of the cell, as is equally known.

The bromine may be replaced in part by chlorine or iodine.

In a primary cell, the positive pole is initially surrounded with the alkylammonium-halide-halogen compound which may advantageously be admixed to or absorbed by a carrier material not easily attacked by elementary halogen, e. g. asbestos, graphite powder or the like. This arrangement is, of course, equally suitable for secondary cells.

In the accompanying drawings I have illustrated two cells according to this invention in axial sections, Fig. 1 showing a dry cell and Fig. 2 a wet cell.

The cell according to Fig. 1 has a cylindrical container 1 forming the negative electrode and being made, for example, from zinc or cadmium. This is sealed by a lid 2 made from an electrically insulating and chemically resisting material, e. g. hard rubber or high-melting asphalt. The lid has a central aperture in which the positive electrode 3 is held by friction, and a refill opening 4 stoppered by a plug 5. The positive electrode is a rod consisting of graphite, magnetite ($Fe_3O_4$) or the like. On its larger part within the cell, a layer 6 of powdered graphite, magnetite or the like material, the same as that of the rod itself, is molded, which is surrounded by a bag 7 of glass or asbestos fabric and admixed with the alkylammonium-halide-halogen compound. For the rest, the cell is filled with an absorbent mass 8 soaked with the electrolyte, leaving free only a small gas space 9 in the top part of the cell. Terminals 10 and 11 are fixed to the positive and negative poles respectively.

The wet cell according to Fig. 2 has a glass container 13 sealed by a lid 14 in which the positive pole 15, which is a rod of graphite, magnetite or the like, with terminal 12 is secured with friction and which has a refill opening 16 stoppered by a plug 17. The negative pole is a zinc or the like sleeve 18 secured at its upper end to the lid 14 and extending nearly to the bottom of the container 13. A plurality of openings 19 are provided therein. The larger part of the positive electrode inside the container is covered by a powdered layer 20 of the same material as the pole itself, which layer is contained in a bag 21 and admixed with alkylammonium halide-halogen compound. The electrolyte 22 is in the form of an aqueous solution.

I claim:

1. An electric cell having an insoluble positive pole formed by a conductor which is relatively little attacked by halogen; a negative pole formed by a metal standing low in the electromotive series; and an aqueous salt solution as electrolyte; the positive pole being surrounded with alkylammonium halide which contains non-ionic halogen other than fluorine in addition to the halide ion.

2. An electric cell having an insoluble positive pole formed by a conductor selected from the group consisting of carbon, platinum and magnetite; a negative pole formed by a metal standing low in the electromotive series; and an aqueous salt solution as electrolyte; the positive pole being surrounded with alkylammonium halide which contains non-ionic halogen other than fluorine in addition to the halide ion.

3. An electric cell having an insoluble positive pole formed by a conductor which is relatively little attacked by halogen; a negative pole formed by a metal standing low in the electromotive series; and an aqueous salt solution as electrolyte; the positive pole being surrounded with tetramethylammonium halide which contains non-ionic halogen other than fluorine in addition to the halide ion.

4. An electric cell having an insoluble positive pole formed by a conductor which is relatively little attacked by halogen; a negative pole formed by a metal standing low in the electromotive series; and a aqueous salt solution as electrolyte; the positive pole being surrounded with tetraethylammonium halide which contains non-ionic halogen other than fluorine in addition to the halide ion.

5. An electric cell having an insoluble positive pole formed by a conductor which is relatively little attacked by halogen; a negative pole formed by a metal standing low in the electromotive series; and an aqueous salt solution as electrolyte, said solution containing a halide of the metal from which the negative pole is made; the positive pole being surrounded with alkylammonium halide which contains non-ionic halogen other than fluorine in addition to the halide ion.

6. An electric cell having an insoluble positive pole formed by a conductor which is relatively little attacked by halogen; a negative pole formed by a metal standing low in the electromotive series; and an aqueous salt solution as electrolyte; the positive pole being surrounded with a layer composed of a powderous conductor which is relatively little attacked by halogen, in admixture with alkylammonium halide which contains non-ionic halogen other than fluorine in addition to the halide ion.

7. An electric cell having an insoluble positive pole formed by a conductor which is relatively little attacked by halogen; a negative pole formed by a metal standing low in the electromotive series; and an aqueous salt solution as electrolyte; the positive pole being initially surrounded with alkylammonium halide which contains non-ionic halogen other than fluorine in addition to the halide ion.

8. An electric cell having an insoluble positive pole formed by a conductor which is relatively little attacked by halogen; a negative pole formed by a metal standing low in the electromotive series; and an aqueous salt solution as electrolyte; the positive pole being initially surrounded with alkylammonium halide and, by charging, associated with non-ionic halogen other than fluorine in addition to the halide ion.

9. An electric cell having an insoluble positive pole formed by a conductor which is relatively little attacked by halogen; a negative pole formed by a metal standing low in the electromotive series; and a bromide-containing aqueous salt solution as electrolyte; the positive pole being surrounded with tetraalkylammonium bromide which contains non-ionic bromine in addition to the bromide ion.

10. An electric cell having an insoluble positive pole formed by a conductor which is relatively little attacked by halogen; a negative pole formed by a metal standing low in the electromotive series; and a bromide-containing aqueous salt holution as electrolyte; the positive pole being surrounded with tetramethylammonium bromide which contains non-ionic bromine in addition to the bromide ion.

11. An electric cell having an insoluble positive pole formed by a conductor which is relatively little attacked by halogen; a negative pole formed by a metal standing low in the electromotive series; and an aqueous salt solution as electrolyte, said solution containing a halide of the metal of which the negative pole is made; the positive pole being surrounded with alkylammonium halide which contains complex-bound non-ionic elemental halogen other than fluorine in addition to the halide ion.

12. An electric cell having an insoluble positive pole formed by a conductor which is relatively little attacked by halogen; a negative pole formed by a metal standing low in the electromotive series; and a bromide-containing aqueous salt solution as electrolyte, the cation of said bromide being the metal of which said negative pole is made; the positive pole being surrounded with a solid mass of alkyl ammonium bromide containing in chemical but non-ionic association elemental bromine in addition to the bromide ion.

R. BLOCH.

REFERENCES CITED

The following references are of record in the file of this patent:

UNITED STATES PATENTS

| Number | Name | Date |
|---|---|---|
| 759,065 | Betts | May 3, 1904 |
| 870,973 | Little | Nov. 12, 1907 |
| 950,861 | Morrison | Mar. 1, 1910 |
| 1,357,160 | French | Oct. 26, 1920 |
| 1,676,007 | Csanyi | July 3, 1928 |
| 2,164,755 | Marhenkel | July 4, 1939 |
| 2,306,927 | Arsem | Dec. 29, 1942 |

FOREIGN PATENTS

| Number | Country | Date |
|---|---|---|
| 283,559 | Great Britain | Apr. 12, 1928 |
| 467,828 | Great Britain | June 21, 1937 |

OTHER REFERENCES

Otto et al., Trans. Electrochemical Socy., vol. 90, (1946), pages 421-423 and 432.